(12) United States Patent
Chen et al.

(10) Patent No.: US 8,111,479 B2
(45) Date of Patent: Feb. 7, 2012

(54) PERPENDICULAR MAGNETIC RECORDING HEAD HAVING A NOTCHED TRAILING SHIELD

(75) Inventors: Tsung Yuan Chen, San Jose, CA (US); Wen-Chien David Hsiao, San Jose, CA (US); Yimin Hsu, Sunnyvale, CA (US); Vladimir Nikitin, Campbell, CA (US); Changqing Shi, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1100 days.

(21) Appl. No.: 11/877,570

(22) Filed: Oct. 23, 2007

(65) Prior Publication Data

US 2009/0103211 A1 Apr. 23, 2009

(51) Int. Cl.
*G11B 5/127* (2006.01)
*G11B 5/23* (2006.01)

(52) U.S. Cl. ......... 360/125.21; 360/119.02; 360/119.04; 360/125.22; 360/125.25

(58) Field of Classification Search ........... 360/125.02–125.32, 119.02–119.13
See application file for complete search history.

(56) References Cited

U.S. PATENT DOCUMENTS

| | | | |
|---|---|---|---|
| 5,621,596 A | 4/1997 | Santini | 360/126 |
| 6,504,678 B1 | 1/2003 | Kamijima | 360/126 |
| 6,510,024 B2 | 1/2003 | Otsuka et al. | 360/126 |
| 6,614,620 B2 | 9/2003 | Tagawa et al. | 360/126 |
| 6,624,971 B1 | 9/2003 | Sasaki | 360/126 |
| 6,694,604 B2 | 2/2004 | Santini | 29/603.14 |
| 6,721,129 B2 | 4/2004 | Lam | 360/119 |
| 6,785,953 B2 | 9/2004 | Santini | 29/603.14 |
| 6,826,014 B2 | 11/2004 | Lam et al. | 360/126 |
| 7,009,812 B2 * | 3/2006 | Hsu et al. | 360/125.12 |
| 7,095,585 B2 | 8/2006 | Payne et al. | 360/125 |
| 7,110,217 B2 | 9/2006 | Lee et al. | 360/126 |
| 7,212,379 B2 * | 5/2007 | Hsu et al. | 360/125.16 |
| 7,593,185 B2 * | 9/2009 | Yazawa | 360/125.28 |
| 7,643,246 B2 * | 1/2010 | Yazawa et al. | 360/125.2 |
| 2005/0219743 A1 | 10/2005 | Guan et al. | 360/125 |
| 2006/0092564 A1 * | 5/2006 | Le | 360/126 |
| 2007/0268626 A1 * | 11/2007 | Taguchi et al. | 360/126 |

\* cited by examiner

*Primary Examiner* — Allen Heinz
(74) *Attorney, Agent, or Firm* — Zilka-Kotab, PC

(57) ABSTRACT

A magnetic write head for perpendicular magnetic data recording having a trailing shield with a two step throat height. The trailing shield is formed over a non-magnetic bump that forms a notch in the leading edge of the trailing shield. This notch defines a first, smaller throat height closest to the write pole and a larger throat height away from the write pole. The smaller throat height near the write pole prevents excess magnetic flux from leaking to the write pole, thereby ensuring efficient strong write field. The larger trailing shield throat height away from the write pole prevents magnetic saturation of the trailing shield and also greatly facilitates manufacturing avoiding problems related to variations and deviations in manufacturing processes used to define the trailing shield.

16 Claims, 7 Drawing Sheets

PERPENDICULAR MAGNETIC RECORDING HEAD HAVING A NOTCHED TRAILING SHIELD

FIELD OF THE INVENTION

The present invention relates to perpendicular magnetic recording and more particularly to a magnetic write head having a bump structure that forms a trailing shield with a short throat height near the write pole and a larger throat height away from the write pole.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Certain design parameters are important to efficient write head performance. However, as the write heads become ever smaller, it becomes ever more difficult to control these desired parameters. Therefore, there is a need for a structure and/or method of manufacture that can maximize these write head parameters even in very small write heads.

SUMMARY OF THE INVENTION

The present invention provides a write head for magnetic data recording. The write head includes a magnetic write pole and a magnetic trailing shield formed adjacent to a trailing edge of the write pole, the trailing shield being separated from the trailing edge of the write pole by a non-magnetic gap layer. The trailing shield including a notch that forms a first throat height in a region adjacent to the write pole and a second throat height, in a region away from the write pole, that is larger than the first throat height.

The smaller throat height adjacent to the write pole prevents excessive flux loss to the trailing shield, thereby ensuring high write field. The larger throat height away from the write pole advantageously prevents saturation of the trailing shield in regions removed from the write pole, even when the trailing shield has nonmagnetic inclusions or impurities. This ensures that the trailing shield will not choke off magnetic flux (even in regions having such inclusions or impurities) and will not leak flux to the magnetic medium as a result of such non-magnetic impurities.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
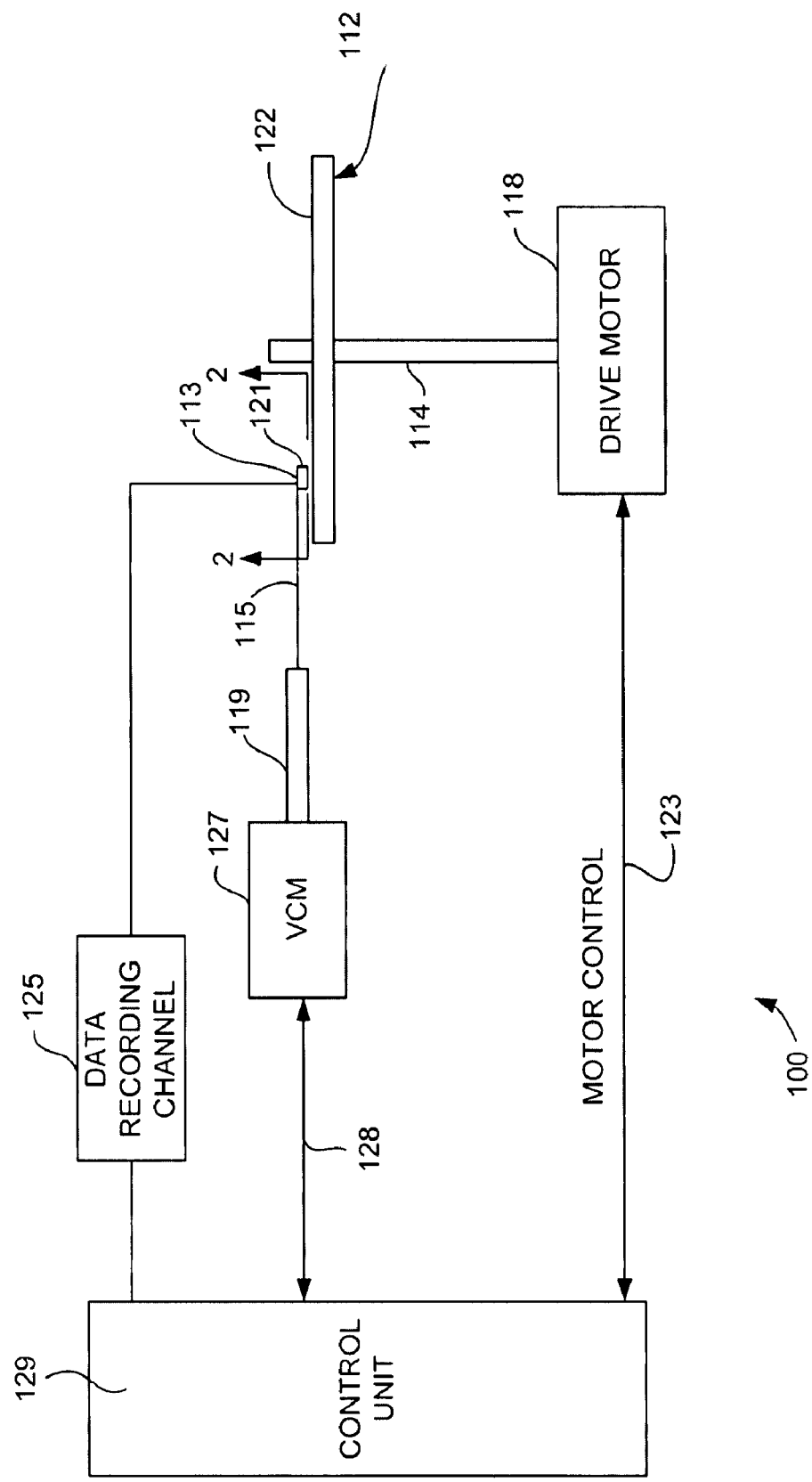
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
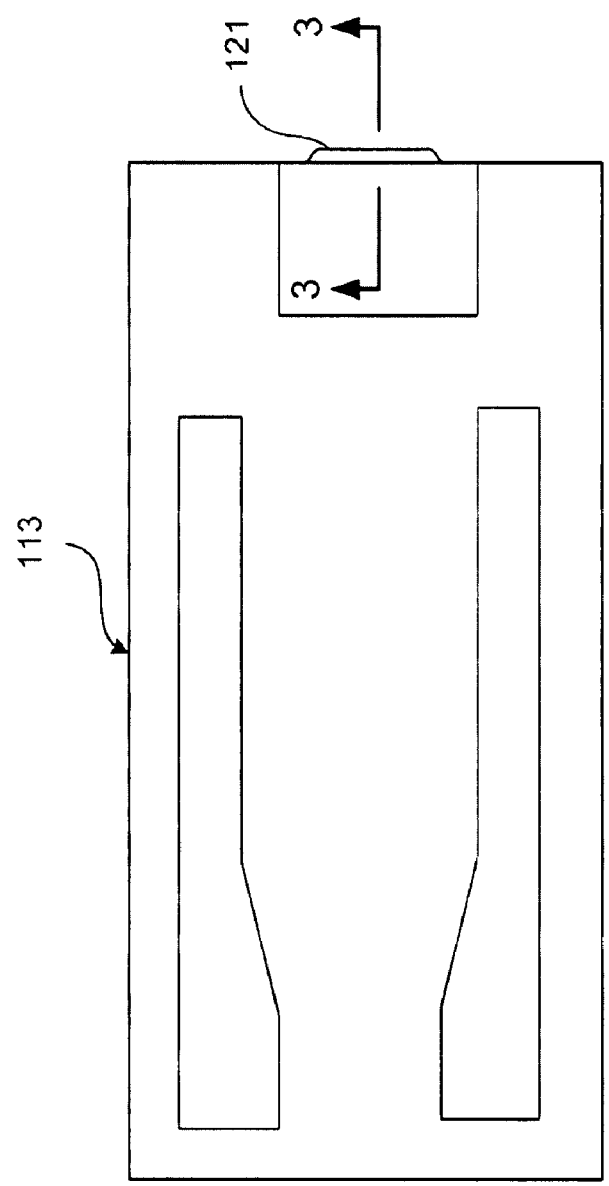
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
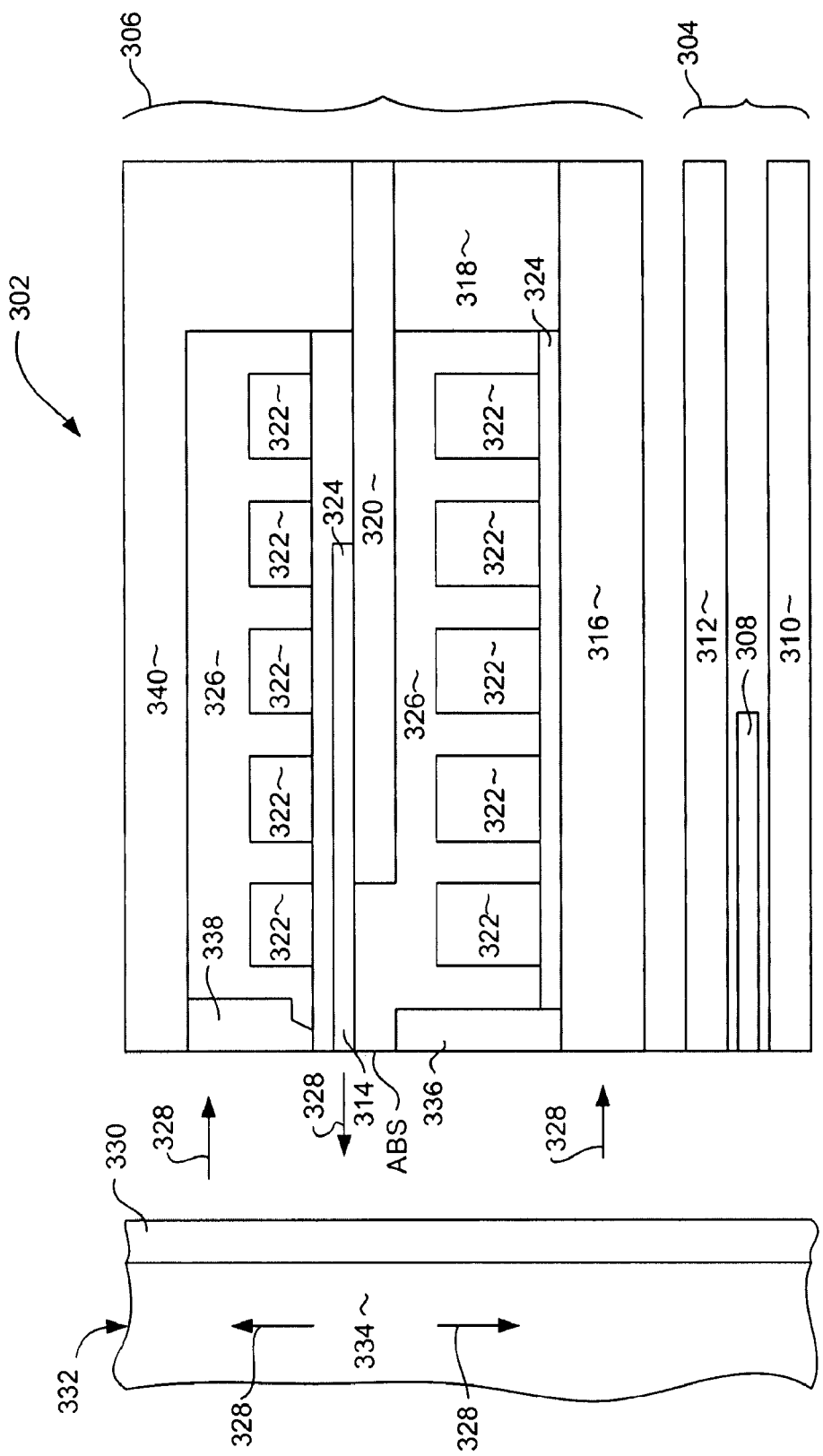
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic write head 302. The magnetic head 302 can include a read head portion 304 and a write head portion 306. The read head portion 304 can include a magnetoresistive sensor 308 such as a giant magnetoresistive sensor GMR, tunnel valve (TMR) etc. The magnetoresistive sensor 308 can be located between first and second magnetic shields 310. 312.

The write head 306 includes a write pole 314, having an end disposed toward an air bearing surface (ABS). The write head also includes a return pole 316, which also has an end disposed toward the ABS. The return pole 316 is magnetically connected with a magnetic back gap 318. The write pole 314 can be connected with a magnetic shaping layer 320 that is itself connected with the back gap 318, so that tie write pole 314, shaping layer 320 back (lap 318 and bottom return pole 316 are all magnetically connected with one another in a region removed from the ABS. The shaping layer 320, back gap 318 and return pole 316 can be constructed of a magnetic material such as NiFe or CoFe. The write pole 320 is preferably constructed of a high magnetic moment, low coercivity magnetic material, and is more preferably constructed as a laminate of layers of magnetic material separated by thin layers of non-magnetic material.

The write head 306 also includes an electrically conductive write coil 322, shown in cross section in FIG. 3. The write coil can be constructed of, for example, Cu and can be a pancake coil that wraps around the back gap 318 or can be a helical coil having upper and lower leads (as shown) disposed above and below the write pole 314 and shaping layer 320. The upper and lower leads of the write coil 322 can each be formed upon an insulating layer 324 and surrounded by a coil insulation layer 326 and the upper leads can be connected with certain of the bottom leads in regions into and out of the plane of the page and, therefore, not shown in FIG. 3.

During operation, a magnetic field from the write coil 322 causes a magnetic flux to flow through the shaping layer 320 and write pole 314. This causes a magnetic write field 328 to emit from the write pole 314 at the ABS. This write field 328 passes through a thin magnetically hard top layer 330 of an adjacent magnetic medium 332. The write field then travels through a magnetically soft under-layer 334 of the magnetic medium 332 before passing back to the return pole 316. The write field emitted from the write pole 314 locally magnetizes the magnetically hard top layer 330, thereby writing a bit of data. The return pole 316 has a cross section at the ABS that is much larger than that of the write pole 314 so that the write field 328 passing back to the return pole is sufficiently spread out that it does not erase the previously recorded bit.

A magnetic pedestal 336 can be provided, and can be magnetically connected with the return pole 316 at the ABS end of the return pole 316, extending toward, but not to the write pole 314. The magnetic pedestal can act as a shield to prevent stray fields, such as from the write coil 332 from inadvertently writing to the magnetic medium 332.

With reference still to FIG. 3, the write head 306 includes a trailing magnetic shield. The presence of the trailing magnetic shield 338 increases the field gradient of the write field 328, thereby increasing the speed with which the write head 306 can write data. The trailing shield 338 can be magnetically connected with the back portion of the write head 306 by a magnetic upper or trailing return pole 340 or could just be a floating design.

The trailing shield 338 functions by attracting write field 338 toward it. There is, however, a fine balance between attracting enough magnetic field 338 toward the trailing shield to increase the write field gradient, and loosing too much field to the trailing shield 338 which would decrease the strength of the write field 328. Several parameters affect the efficiency of the trailing shield 338 and must, therefore, be tightly controlled.

Figure 4:
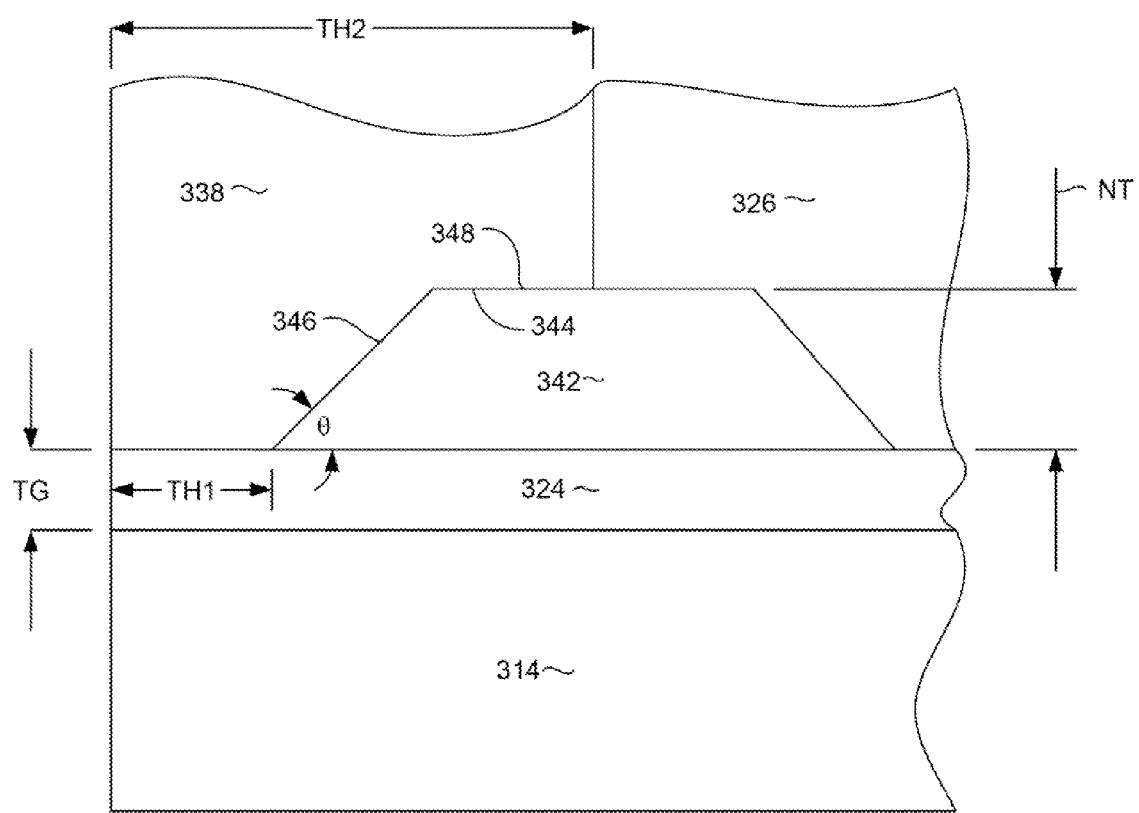
FIG. 4 is an enlarged view showing a portion of a trailing shield according to an embodiment of the invention.

FIG. 4 shows an enlarged view of a portion of the trailing shield 338. As can be seen, the trailing shield 338 is separated from the write pole 314 by a non-magnetic trailing gap 324 having a thickness defining a shield gap TG at the ABS. The trailing gap 324 and trailing shield 338 are adjacent to the trailing edge 325 of the write pole 314. The term "trailing" refers to the direction of travel over the medium 332 (FIG. 3). Therefore, the trailing shield 338 is separated from the trailing edge 325 of the write pole 314 by the trailing gap 324 having a thickness TG. The non-magnetic layer 324 separating the trailing shield 338 from the write pole 314 can be constructed of various non-magnetic materials, such as alumina, Rh, etc. This trailing gap thickness TG is one of the parameters that affects the performance of the trailing shield 338. If the TG is too large, write field gradient will not be sufficiently increased. If TG is too small, then too much field will be lost to the trailing shield 338 and the write field will be too weak.

Another parameter that greatly affects the performance of the trailing shield is the throat height of the trailing shield. The throat height is defined as the distance from the ABS to the back edge of the trailing shield opposite the ABS. As write heads become ever smaller, this trailing shield throat height must also become smaller. Write head sizes are reaching the point that, order for the trailing shield to function properly, it must be constructed with such a small throat height that it eventually become impractical and impossible to manufacture. For instance, the trailing shield throat height can become so small minor manufacturing variations (such as during lapping) could cause to trailing shield 338 to be completely removed in spots or to be so large that write field suffers.

The present invention overcomes this problem by providing a hybrid trailing shield having one throat height TH1 adjacent to the trailing gap 324 and another (larger) throat height TH2 away from the trailing gap 324. This hybrid trailing shield configuration is provided by forming the trailing shield 338 on a non-magnetic bump 342. This non-magnetic bump 342 can be constructed of, for example, alumina or could be some other material. The bump 342 forms a notch 344 in the trailing shield 338 at a location adjacent to the write gap 324 and which extends toward the back edge of the trailing shield 338.

Therefore, the bump 342 and resulting notch 344 allow the trailing shield 338 to have a very small throat height TH1 adjacent to the write pole 314 and trailing gap 324 where such small throat height is needed to avoid loosing too much write field to the trailing shield. The bump further allows the trailing shield 338 to have a larger throat height TH2 away from the write pole 314 and trailing gap 324, where Such larger throat height will not affect or cause such a loss of write field. The larger throat height TH2 keeps the trailing shield 338 from becoming magnetically saturated, thereby improving the efficiency of the trailing shield 338 and the performance of the write head 306 (FIG. 3). The larger throat height TH2 also facilitates manufacture allowing existing manufacturing techniques to be employed with existing manufacturing variations.

The presence of the bump 342 and notch 344 provides another important benefit as well. As can be seen in FIG. 3, the trailing shield 338 and second return pole 340 provide an additional return path for the field 328. The larger trailing shield throat height TH2 (FIG. 4) provides a more efficient return path for the magnetic write field, thereby increasing the writer efficiency. The presence of the bump 342 and notch 344 allow this increase in writer efficiency while also maintaining the necessary smaller throat height TH1 at the leading edge of the trailing shield 338 near the write pole 314 in order to ensure minimal loss of write field from tile write pole to the trailing shield 338.

Figure 5:
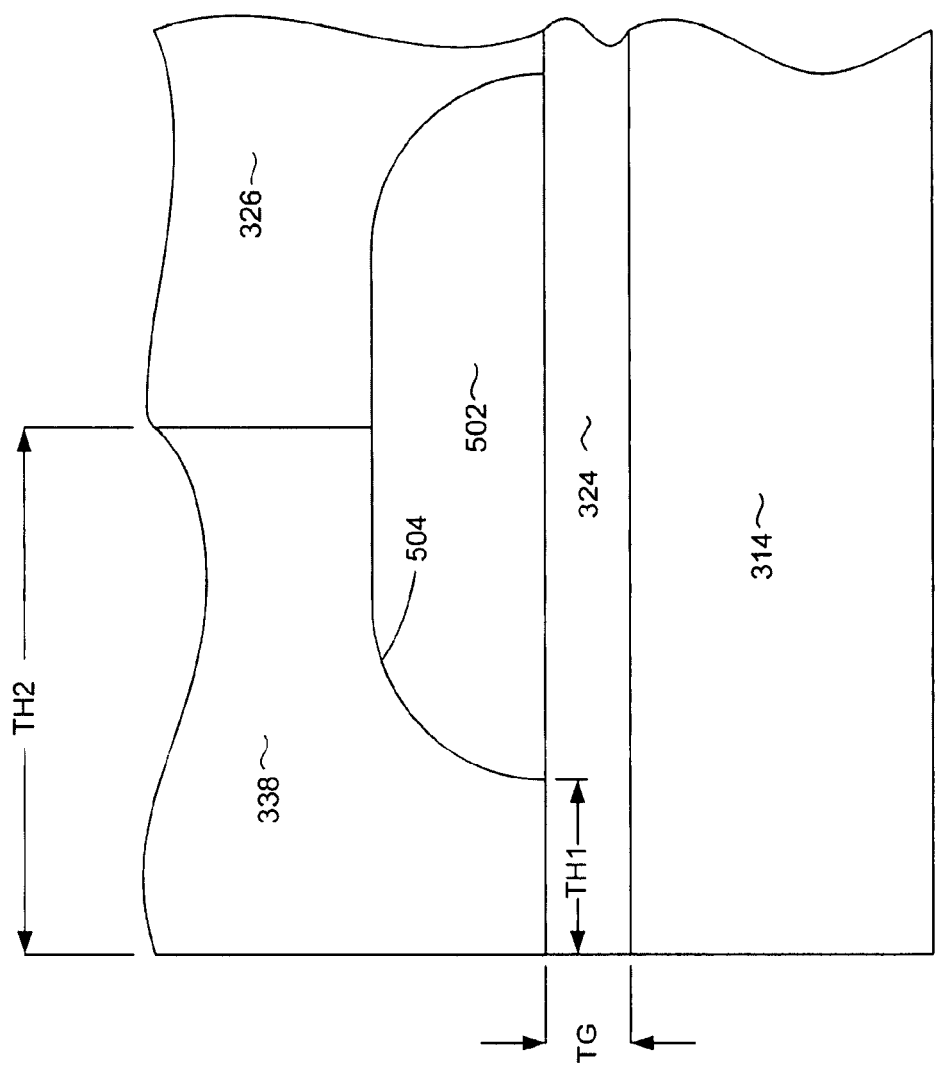
FIG. 5 is an enlarged view showing a portion of a trailing shield according to another embodiment of the invention.
Figure 6:
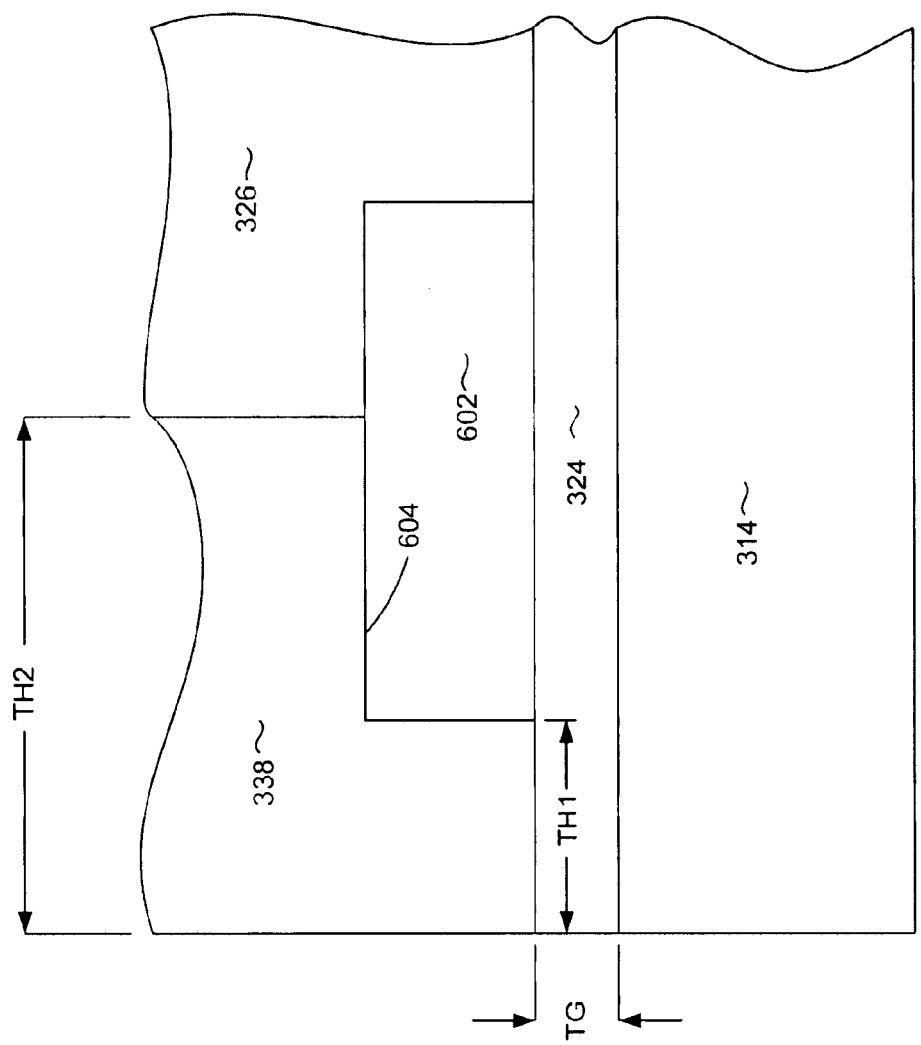
FIG. 6 is an enlarged view showing a portion of a trailing shield according to yet another embodiment of the invention.

With continued reference to FIG. 4, the non-magnetic bump 342 can be configured to form the trailing shield notch 344 with configuration that has an angled edge portion 346 and a substantially flat edge portion 348. The angled edge 346 preferably forms an angle θ of 30-60 degrees with respect to the trailing gap. Alternatively, as shown in FIG. 5, a bump 502 and notch 504 can be configured have a rounded shape. Or, as shown in FIG. 6, a bump 602 and notch 604 can be configured to have a substantially rectangular shape. As shown in either of FIGS. 4, 5 and 6, the bump 342 and corresponding notch can have a notch depth NT measured in the trailing direction that is preferably 1-2 times or about 1.5 times the trailing shield gap TG. The NT is the height of the non-magnetic bump 342, 502, 504 as measured in a down-track direction, or vertically as shown in FIGS. 3, 4, 5 and 6. The trailing gap TG is the distance between the trailing shield 338 and the write pole 314, also measured in a down-track direction. Therefore, the notch and bump height NT can be, for example, 20-100 nm or about 60 nm. Although angled, rounded and rectangular bump/notch configurations are shown in FIGS. 4, 5 and 6, this is by way of example only. Other bump/notch configurations are possible and would fall within the scope of the invention as well. Although various notch configurations are possible and would fall within the scope of the invention, the invention preferably uses an angle notch 344 such as that described with reference to FIG. 4. Such an angled notch provides a desired balance of manufacturability and optimal shield performance.

The first throat height TH1 is preferably about 0.5-1.5 times the shield gap TG. This ensures minimal flux leakage from the main pole to the shield. The second throat height TH2 is larger, preferably about 3 times the shield gap TG. This larger throat height TH2 minimizes the chance that a localized defect to the shield could cause an unwanted erasure of the medium.

Figure 7:
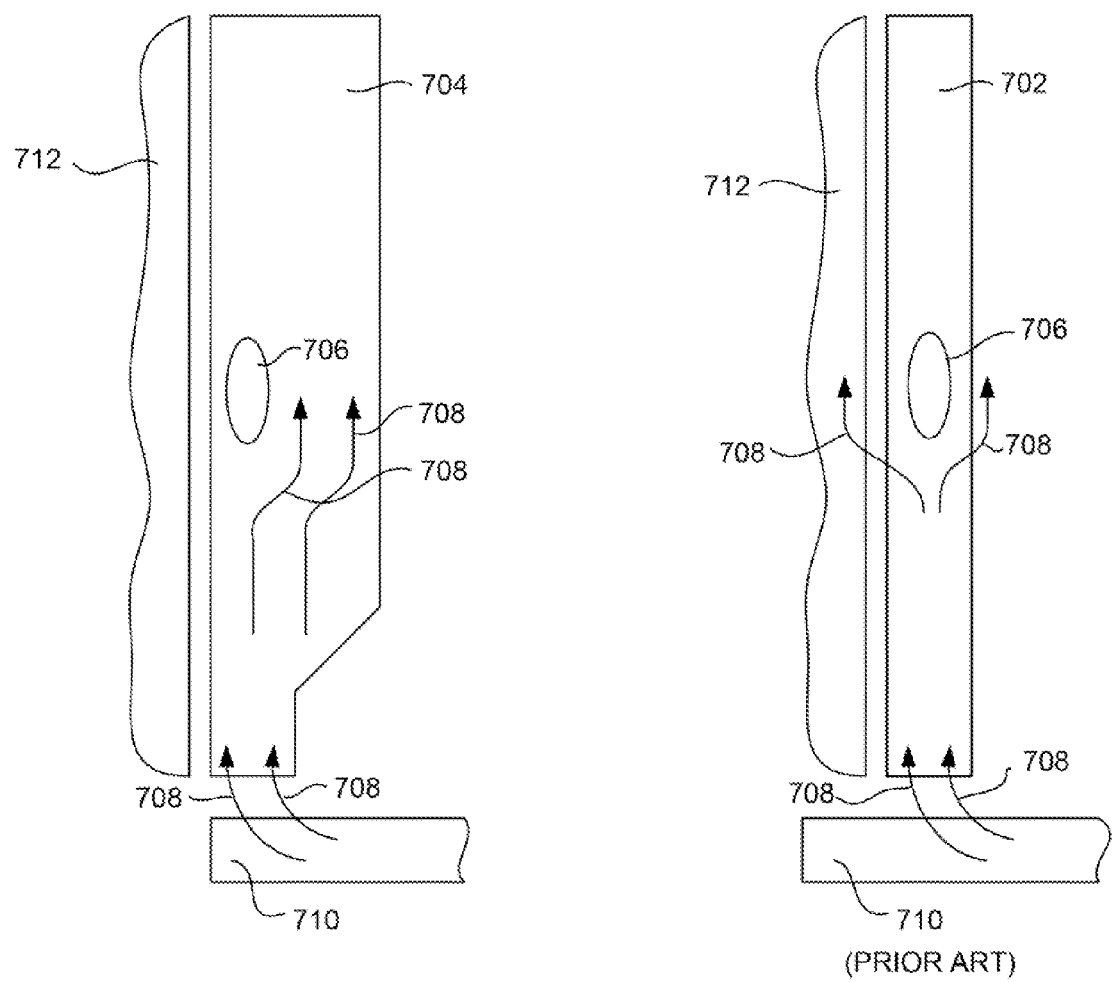
FIG. 7 is a cross sectional view of a prior art trailing shield compared with a trailing shield according to an embodiment of the invention showing the affect of a non-magnetic inclusion on each.

With reference now to FIG. 7, an important advantage of the novel hybrid trailing shield design can be better understood. FIG. 7 shows a trailing shield 702 according to the prior art, as compared with a trailing shield 704 according to a possible embodiment of the invention. Because of irregularities in manufacturing magnetic heads at very small sizes, it is always possible that a defect 706 can be present in a trailing shield (either 702 or 704. Such a defect 706 can take the form of an inclusion of non-magnetic (or less magnetic) material within the trailing shield. As magnetic flux 708 from the write pole 710 flows through the magnetic shield (702, 704), this flux 708 must pass around the non-magnetic inclusion 706.

While it is necessary to have short throat height at the write pole 710 in order to prevent the trailing shield (702, 704) from stealing too much flux 708 from the write pole 710 (and therefore reducing write field to the medium). The narrower throat height of the prior art trailing shield 702 away from write pole 710 does not allow the magnetic flux to flow freely around the non-magnetic inclusion 706. As a result, the portions of the shield 702 adjacent to the inclusion 706 become saturated, causing magnetic flux/field 708 to leak from the shield 702 to inadvertently write to the magnetic medium 712.

However, as can be seen with respect to a trailing shield 704 according to an embodiment of the invention. The larger throat height way from the magnetic write pole 710 allows the magnetic flux 708 to travel around the defect (non-magnetic inclusion) 706 without saturating the trailing shield 704 and without leaking to and write to the adjacent magnetic medium.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic data recording, comprising:
    a magnetic write pole having a trailing edge and having an end disposed at an air bearing surface; and
    a magnetic trailing shield located at the air bearing surface and adjacent to the trailing edge of write pole, the trailing shield being separated from the trailing edge of the write pole by a non-magnetic trailing gap layer and extending in a trailing direction a portion of the trailing shield being formed over a non-magnetic bump; wherein
    the non-magnetic bump causes the trailing shield to be formed with a notch at an end nearest the write pole, the notch defining a first throat height, measured from the air bearing surface to a beginning of the non-magnetic bump, and a second throat height, measured from the air bearing surface to a back edge of the trailing magnetic shield, the first throat height being smaller than the second throat height;
    wherein the non-magnetic trailing gap has a thickness (TG) and the notch has a height measured in the trailing direction that is 1-2 times TG.

2. A magnetic write head for perpendicular magnetic data recording, comprising:
    a magnetic write pole having a trailing edge and having an end disposed at an air bearing surface; and
    a magnetic trailing shield located at the air bearing surface and adjacent to the trailing edge of write pole, the trailing shield being separated from the trailing edge of the write pole by a non-magnetic trailing gap layer and extending in a trailing direction a portion of the trailing shield being formed over a non-magnetic bump: wherein
    the non-magnetic bump causes the trailing shield to be formed with a notch at an end nearest the write pole, the notch defining a first throat height, measured from the air bearing surface to a beginning of the non-magnetic bump, and a second throat height, measured from the air bearing surface to a back edge of the trailing magnetic shield, the first throat height being smaller than the second throat height;
    wherein the non-magnetic trailing gap has a thickness (TG) and the notch has a height measured in the trailing direction that is about 1.5 times TG.

3. A magnetic write head for perpendicular magnetic data recording comprising:
    a magnetic write pole having a trailing edge and having an end disposed at an air bearing surface; and
    a magnetic trailing shield located at the air bearing surface and adjacent to the trailing edge of write pole, the trailing shield being separated from the trailing edge of the write pole by a non-magnetic trailing gap layer and extending in a trailing direction a portion of the trailing shield being formed over a non-magnetic bump; wherein
    the non-magnetic bump causes the trailing shield to be formed with a notch at an end nearest the write pole, the notch defining a first throat height, measured from the air bearing surface to a beginning of the non-magnetic bump, and a second throat height, measured from the air bearing surface to a back edge of the trailing magnetic shield, the first throat height being smaller than the second throat height;
    wherein the notch has first and second edges, the first edge defining an acute angle with respect to the non-magnetic trailing gap and the second edge is substantially parallel with the non-magnetic trailing gap; and
    wherein the first edge forms an angle of 30-60 degrees with respect to the trailing gap.

4. A magnetic write head for perpendicular magnetic data recording, comprising:
    a magnetic write pole having a trailing edge and having an end disposed at an air bearing surface; and
    a magnetic trailing shield located at the air bearing surface and adjacent to the trailing edge of write pole, the trailing shield being separated from the trailing edge of the write pole by a non-magnetic trailing gap layer and extending in a trailing direction a portion of the trailing shield being formed over a non-magnetic bump; wherein
    the non-magnetic bump causes the trailing shield to be formed with a notch at an end nearest the write pole, the notch defining a first throat height, measured from the air bearing surface to a beginning of the non-magnetic bump, and a second throat height, measured from the air bearing surface to a back edge of the trailing magnetic shield, the first throat height being smaller than the second throat height;
    wherein the trailing shield is separated from the write pole by a trailing gap thickness TG and wherein the first throat height is 0.5 to 1.5 times the trailing gap thickness (TG).

5. A magnetic write head as in claim 4 further comprising a magnetic return pole, connected with the trailing magnetic shield, and magnetically connected with the write pole in a region removed from the air bearing surface.

6. A magnetic write head as in claim 4 wherein the notch has a rounded shape.

7. A magnetic write head as in claim 4 wherein the notch has a generally rectangular shape.

8. A magnetic data recording device, comprising:
    a housing;
    a magnetic media movably mounted within the housing;
    a slider;
    an actuator connected with the slider for moving the slider relative to a surface of the magnetic media; and a magnetic write head connected with the slider for movement adjacent to the magnetic medium, the magnetic write head further comprising:

a magnetic write pole having a trailing edge and having an end disposed at an air bearing surface; and a magnetic trailing shield located at the air bearing surface and adjacent to the trailing edge of write pole, the trailing shield being separated from the trailing edge of the write pole by a non-magnetic trailing gap layer and extending in a trailing direction a portion of the trailing shield being formed over a non-magnetic bump; wherein the non-magnetic bump causes the trailing shield to be formed with a notch at an end nearest the write pole; the notch defining a first throat height, measured from the air bearing surface to a beginning of the no-magnetic bump, and a second throat height, measured from the air bearing surface to a back edge of the trailing magnetic shield, the first throat height being smaller than the second throat height;

wherein the trailing shield is separated from the write pole by a trailing gap thickness TG and wherein the first throat height is 0.5 to 1.5 times the trailing gap thickness (TG).

9. A magnetic write head for perpendicular magnetic recording, comprising:

a magnetic write pole having an end disposed toward an air bearing surface and having a trailing edge;

a non-magnetic trailing gap layer formed over at least a portion of the trailing edge of the write pole;

a non-magnetic bump formed over a portion of the non-magnetic trailing gap layer, the non-magnetic bump being located near, but not extending to the air bearing surface; and a magnetic trailing shield formed at the air bearing surface and having a leading edge, a portion of the leading edge contacting the non-magnetic trailing gap layer and a portion of the leading edge being formed over the non-magnetic bump; wherein:

the non-magnetic bump forms a notch in the leading edge of the trailing shield;

the notch has a first edge that forms an acute angle with the trailing edge of the write pole and has a second edge that is substantially parallel with the trailing edge of the write pole; and the first edge forms an angle of 30-60 degrees with respect to the trailing edge of the write pole.

10. A magnetic write head as in claim 9 wherein the notch does not extend to the air bearing surface.

11. A magnetic write head as in claim 9 wherein the notch defines a first trailing shield throat height and a second trailing shield throat height, the first trailing shield smaller than the second trailing shield throat height and being located nearer to the write pole than the second trailing shield throat height.

12. A write head as in claim 11 wherein the first throat height is 0.5 to 1.5 times the shield gap TG.

13. A write head as in claim 9 wherein non-magnetic trailing gap has a thickness (TG) and wherein the notch has a depth in the trailing direction that is 1 to 2 times TG.

14. A write head as in claim 9 wherein non-magnetic trailing gap has a thickness (TG) and wherein the notch has a depth in the trailing direction that is about 1.5 times TG.

15. A write head as in claim 9 wherein the notch has a rounded shape.

16. A write head as in claim 9 wherein the notch has a rectangular shape.

* * * * *

UNITED STATES PATENT AND TRADEMARK OFFICE
CERTIFICATE OF CORRECTION

PATENT NO. : 8,111,479 B2  
APPLICATION NO. : 11/877570  
DATED : February 7, 2012  
INVENTOR(S) : Tsung Yuan Chen et al.

It is certified that error appears in the above-identified patent and that said Letters Patent is hereby corrected as shown below:

In the Specification:

Column 4, line 30 replace "so that tie" with --so that the--;

Column 4, line 31 replace "back (lap" with --back gap--;

Column 6, line 21 replace "field from tile" with --field from the--.

Signed and Sealed this
Fourteenth Day of July, 2015

Michelle K. Lee
*Director of the United States Patent and Trademark Office*